United States Patent [19]
Krezak et al.

[11] Patent Number: 4,557,442
[45] Date of Patent: Dec. 10, 1985

[54] EMERGENCY FLIGHT DECK EGRESS LINES

[75] Inventors: John E. Krezak, Bellevue; Michael F. Lamb, Mukilteo, both of Wash.

[73] Assignee: The Boeing Company, Seattle, Wash.

[21] Appl. No.: 547,214

[22] PCT Filed: Sep. 14, 1983

[86] PCT No.: PCT/US83/01403
§ 371 Date: Sep. 14, 1983
§ 102(e) Date: Sep. 14, 1983

[87] PCT Pub. No.: WO85/01264
PCT Pub. Date: Mar. 28, 1985

[51] Int. Cl.[4] .................................................. B64D 25/08
[52] U.S. Cl. .................................. 244/137 P; 182/100; 182/190
[58] Field of Search ............................ 244/137 P, 1 R; 182/190, 100, 196, 228, 189; 272/85, 110, 112; 87/6, 9; 57/206, 207; 156/293, 294, 305; 441/133

[56] References Cited
U.S. PATENT DOCUMENTS

| | | | |
|---|---|---|---|
| 195,024 | 9/1977 | Knox | 182/190 |
| 198,026 | 12/1877 | Kertson | 182/190 |
| 278,763 | 6/1883 | Barnard | 182/190 |
| 294,360 | 3/1884 | Borgfeldt | 182/190 |
| 584,376 | 6/1897 | Landenberger | 182/190 |
| 995,159 | 6/1911 | Lansden | 182/190 |
| 1,594,871 | 8/1926 | Badger et al. | 87/6 |
| 2,094,919 | 10/1937 | Hughes | 87/6 |
| 2,658,702 | 11/1953 | Osborne | 244/DIG. 2 |
| 2,678,853 | 5/1954 | Reeder | 156/294 |
| 3,486,409 | 12/1969 | Powell | 87/6 |
| 4,161,998 | 7/1979 | Trimble | 182/190 |

Primary Examiner—Galen L. Barefoot
Attorney, Agent, or Firm—Morris A. Case; B. A. Donahue

[57] ABSTRACT

A high strength braided thermosetting resin cord acts as a core for an escape line. A series of knobs of a foamed resin are threaded onto the core at spaced intervals with a second series of smaller knobs of a foamed resin located between each adjacent larger knobs. Each of the knobs are bonded with a thermosetting resin to the core. A high strength thermosetting resin is braided over the knobs and core, and one end of the cord is secured to a support member of an airplane to provide an escape line.

10 Claims, 5 Drawing Figures

U.S. Patent    Dec. 10, 1985    4,557,442
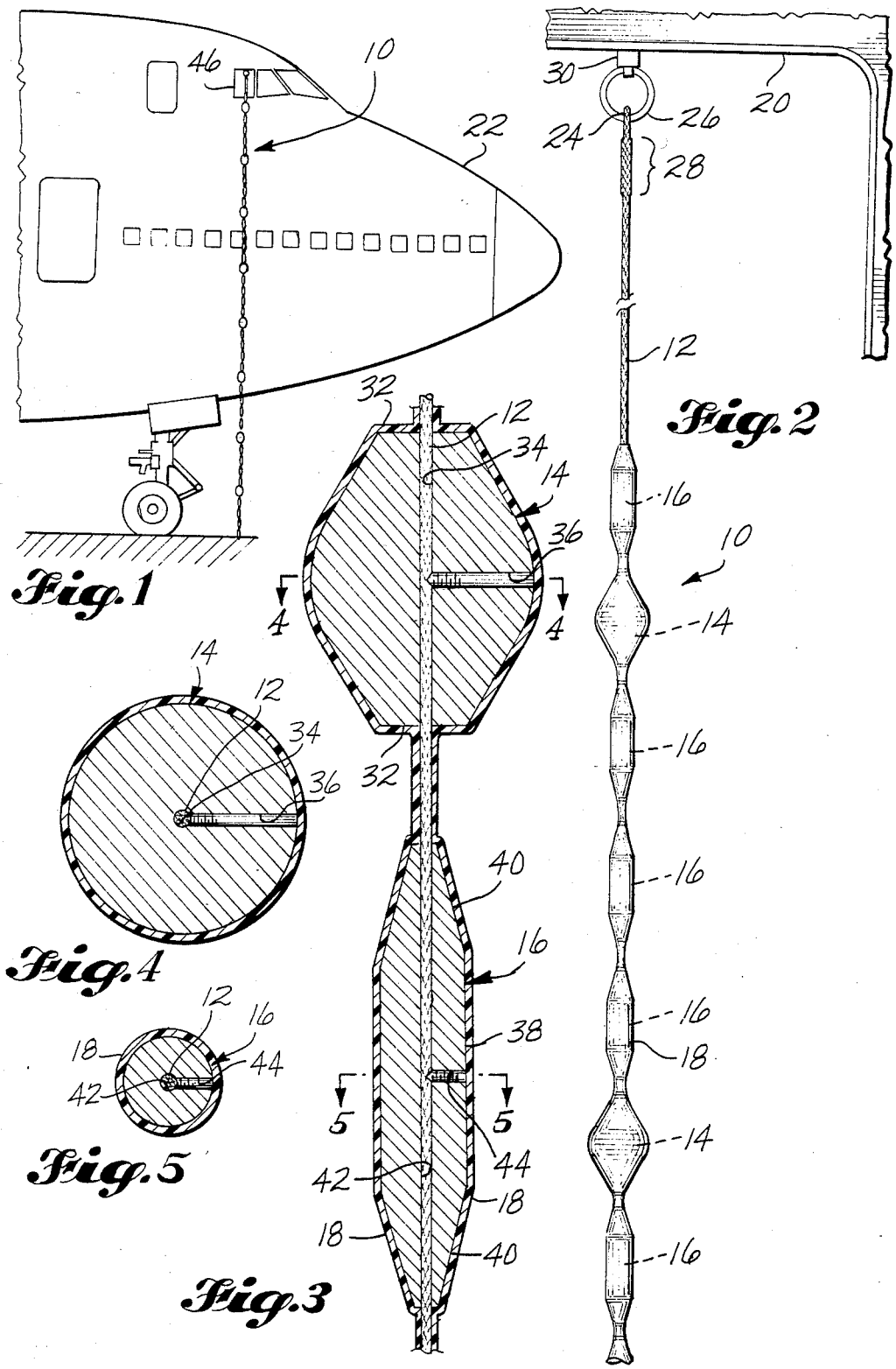

EMERGENCY FLIGHT DECK EGRESS LINES

BACKGROUND OF THE INVENTION

All large commercial aircraft have provisions for escape lines for emergency egress from the flight deck. This normally consists of a rope or a strap that is secured to the aircraft, and extends to the ground through an opened flight deck window.

All areas of an airplane are investigated during the design phase to determine any and all places where a weight savings may be possible. Even though a weight savings found in a particular area is a small amount, it is still important when all such areas are added together. It was found that an escape line could be made that saves weight over presently used lines and in addition proves a much easier line to use.

SUMMARY OF THE INVENTION

A braided aramid resin cord provides a high strength core for an escape line. Foamed thermosetting resin knobs are axially threaded onto the core. The knobs consist of a series of large size spaced apart knobs, with several smaller size knobs located between each pair of the large size knobs. Each of the knobs are bonded in place to the core with a thermosetting resin. An aramid resin is woven over the core with knobs forming a tight fitting jacket. When one end of the line is secured to a support structure the combination provides an escape line.

DESCRIPTION OF THE DRAWINGS

FIG. 1 shows a side view of the front end of an airplane with the escape line of this invention in position.

FIG. 2 shows a blown up fragmented view of the support for and the escape line of FIG. 1.

FIG. 3 shows a detailed further blown up view in section of part of the escape line.

FIG. 4 shows a cross sectional view taken along lines 4—4 of FIG. 3.

FIG. 5 shows a cross sectional view taken along lines 5—5 of FIG. 3.

DETAILED DESCRIPTION

Emergency escape line 10, has a core 12, a series of large size hand holds 14, a series of smaller size hand holds 16, and a jacket 18. The escape line is used by securing it to a support member 20, of an airplane 22. The core is of a material strong enough to support several times the heaviest weight expected to be placed on the assembled escape line with a preferred core being of an aramid resin that is braided into a cord. One end of the cord is secured to a structure such as is shown in FIG. 2. In that Figure the cord is looped at 24 through a ring 26, and doubled back on itself, and woven together along the length 28. The ring in turn is secured to fastener 30, which is joined to the support member 20.

The large size hand hold or knob 14, may be ball shaped, however, it preferably is essentially ellipsoidal in snape but with flat ends 32. This knob has an axially located opening 34, sized to slideably accept cord 12. An opening 36, extends axially outward from the axis at about the center of the knob. This opening is sized to accept a needle to be inserted into the opening to be used to inject a thermosetting resin into the axis opening to provide an adhesive to bond the knob to the cord.

The smaller size knob 16, is preferably cylindrical in shape in the middle 38, with the frustum of a cone shape at each end 40. It also has an axial opening 42, to accept the cord and a radial opening 44, extending out from the axial opening to provide access for injecting a resin.

Both types of knobs are of a foamed resin with a polymethacrylimide as the preferred resin. The large size knobs are preferably spaced about 15 inches apart with three smaller size knobs between each of the sets of larger knobs.

Once all the knobs are located and bonded in position the jacket 18 is formed in place. This is accomplished by braiding with an aramid resin to form a covering strong enough by itself to more than support the heaviest weight anticipated.

To prepare an escape line the cord 12 is threaded through the large knobs 14, and the small knobs 16, in the desired order. Then each knob is secured to the cord by injecting a thermosetting resin such as, but not limited to, an epoxy or a urethane resin through opening 36 and 44 to bond the knobs to the cord. Once the resin is set up the jacket of high strength thermosetting resin is woven over the core with knobs. An end of the cord is then secured to a support member 20 by looping the cord at 24, through ring 26, and braiding it back on itself at 28. The ring is then joined to fastener 30; which in turn is joined to the support member.

In normal operation the escape line 10, is joined to the structure 20, and the balance of the line is wound up and put away. When the need arises the window 46 is opened, the line dropped to the ground and used for one to decend to the ground. Should the need arise, one may also use this line to climb back into the airplane.

We claim:

1. A lightweight escape line for an airplane comprising: a high strength polymeric braided cord forming a core, means for securing one end of the cord to a support structure in an airplane, a series of spaced apart foamed resin knobs each having an axial opening for closely fitting over the braided core and each knob bonded with a thermosetting resin to the cord, and a high strength polymeric woven jacket closely covering the cord with bonded knobs to form a lightweight escape line from the airplane to the ground.

2. A lightweight escape line for an airplane as in claim 1, wherein the cord polymer and the jacket polymer is an aramid, and the foamed resin knobs are of a polymethacrylimide resin.

3. A lightweight escape line for an airplane as in claim 1, wherein the foamed resin knobs further comprise a first set of knobs spaced apart along the cord, and a second set of several spaced apart smaller diameter knobs between each of the first set of knobs.

4. A lightweight escape line for an airplane as in claim 3, wherein the cord polymer and the jacket polymer is an aramid, and the foamed resin knobs are of a polymethacrylimide resin.

5. A lightweight escape line for an airplane as in claim 4, wherein each of the larger diameter knobs are essentially ellipsoidal in shape, and the smaller diameter knobs are cylindrical with a frustum of a cone at each end.

6. A lightweight escape line for an airplane as in claim 4, wherein each knob has an opening extending radially from an outer periphery to an axis of the knob to permit injecting the thermosetting resin along the axis for bonding the closely fitting knobs to the cord.

7. A method of forming a lightweight escape line for an airplane, with steps comprising: utilizing a core of high strength braided thermosetting resin, preparing a plurality of foamed resin hand grip members with axial openings for closely fitting over the core and with a radial opening extending outward from the axis opening, threading the core through the axis of each hand grip, spacing the hand grips along the core, injecting a thermosetting resin into the axis of each hand grip through use of the radial opening and curing the resin, weaving a high strength thermosetting resin jacket over the core with bonded hand grips, and securing one end of the core for connection to the structure of an airplane for providing a lightweight escape line from an airplane to the ground.

8. A method of forming a lightweight escape line for an airplane as in claim 7, with further steps comprising: selecting an aramid resin for the core and for the jacket, and utilizing a polymethacrylimide resin for the foamed resin.

9. A method of forming a lightweight escape line for an airplane as in claim 7 with further steps comprising: providing two different configurations of hand grips, spacing the large size hand grips apart from each other, and placing several small size hand grips between each of the large size hand grips.

10. A method of forming a lightweight escape line for an airplane as in claim 9 with further steps comprising: selecting an aramid resin for the core and for the jacket, and utilizing a polymethacrylimide resin for the foamed resin.

* * * * *